(12) United States Patent
Wang et al.

(10) Patent No.: US 9,183,619 B2
(45) Date of Patent: Nov. 10, 2015

(54) REPAIR OR EDITING OF DAMAGED (TORN) SCANNED HALFTONE PRINTS

(75) Inventors: Shen-ge Wang, Fairport, NY (US);
Edgar A. Bernal, Webster, NY (US);
Robert P. Loce, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 129 days.

(21) Appl. No.: 13/559,866

(22) Filed: Jul. 27, 2012

(65) Prior Publication Data

US 2014/0029073 A1    Jan. 30, 2014

(51) Int. Cl.
*H04N 1/52* (2006.01)
*G06T 5/00* (2006.01)
*H04N 1/409* (2006.01)

(52) U.S. Cl.
CPC .............. *G06T 5/005* (2013.01); *H04N 1/4097* (2013.01)

(58) Field of Classification Search
CPC ....... H04N 1/405; H04N 1/407; H04N 1/409; H04N 1/4097; H04N 1/4092; H04N 1/6019; H04N 1/4105; H04N 1/00013; H04N 1/00068; H04N 1/40062
See application file for complete search history.

(56) References Cited

U.S. PATENT DOCUMENTS

| | | | |
|---|---|---|---|
| 2005/0275909 A1* | 12/2005 | Takayama et al. | 358/509 |
| 2006/0066908 A1* | 3/2006 | Kim | 358/3.2 |
| 2008/0068660 A1* | 3/2008 | Loce et al. | 358/3.06 |
| 2010/0060949 A1* | 3/2010 | Kurigata | 358/474 |
| 2010/0157386 A1* | 6/2010 | Okumura | 358/488 |
| 2011/0228296 A1* | 9/2011 | Ikuno | 358/1.9 |

OTHER PUBLICATIONS http://www.docufree.com/solutions/scan.htm#faq17, accessed Jul. 27, 2012, 2 pgs.
http://slidesnmoore.com/Document_Restoration.htm, accessed Jul. 27, 2012, 2 pgs.
http://www.documentconversion.com/ScanningServices.html, accessed Jul. 27, 2012, 2 pgs.
http://research.microsoft.com/en-us/collaboration/global/asia-pacific/programs/eheritage.aspx, accessed Jul. 27, 2012, 3 pgs.
http://www.unesco.org/webworld/ramp/html/r8904e/r8904e03.htm, accessed Jul. 27, 2012, 14 pgs.
http://www.sebastianwintermute.com/25_restoration_torn_document.html, accessed Jul. 27, 2012, 2 pgs.
https://www.ads.tuwien.ac.at/people/Prandtstetter.html/prandtstetter_aussois_07.pdf, accessed Jul. 27, 2012, 42 pgs.

(Continued)

*Primary Examiner* — Martin Mushambo
*Assistant Examiner* — Harris Sabah
(74) *Attorney, Agent, or Firm* — Fay Sharpe LLP

(57) ABSTRACT

When restoring a scanned halftone image of a damaged document, parameters of the halftone structure (geometry) are estimated, as is an intended contone gray level for damaged portions of the image. Locations of halftone cell tiles in the scanned image are determined based on the halftone structure, and a halftone profile model is generated using the estimated halftone parameters and contone information. Image segments are aligned using global features for coarse alignment and halftone structure for fine alignment, such as in cases where the scanned halftone image contains unconnected fragments. Missing parts of the damaged document image are filled in using the halftone profile model and estimated contone values.

17 Claims, 7 Drawing Sheets

(56) References Cited

OTHER PUBLICATIONS http://www.archives.nysed.gov/a/records/mr_cons_imgservices.shtml, accessed Jul. 27, 2012, 24 pgs.

J.A.Cannataci, R. Rivenc, N.P.Zammit, C.Borga, G.Guidi, G.A. Beraldin, "E-Heritage: The Future for Integrated Applications in Cultural Heritage," The International Archives of the Photogrammetry, Remote Sensing and Spatial Information Sciences, vol. XXXIV, Part 5/W12.

* cited by examiner

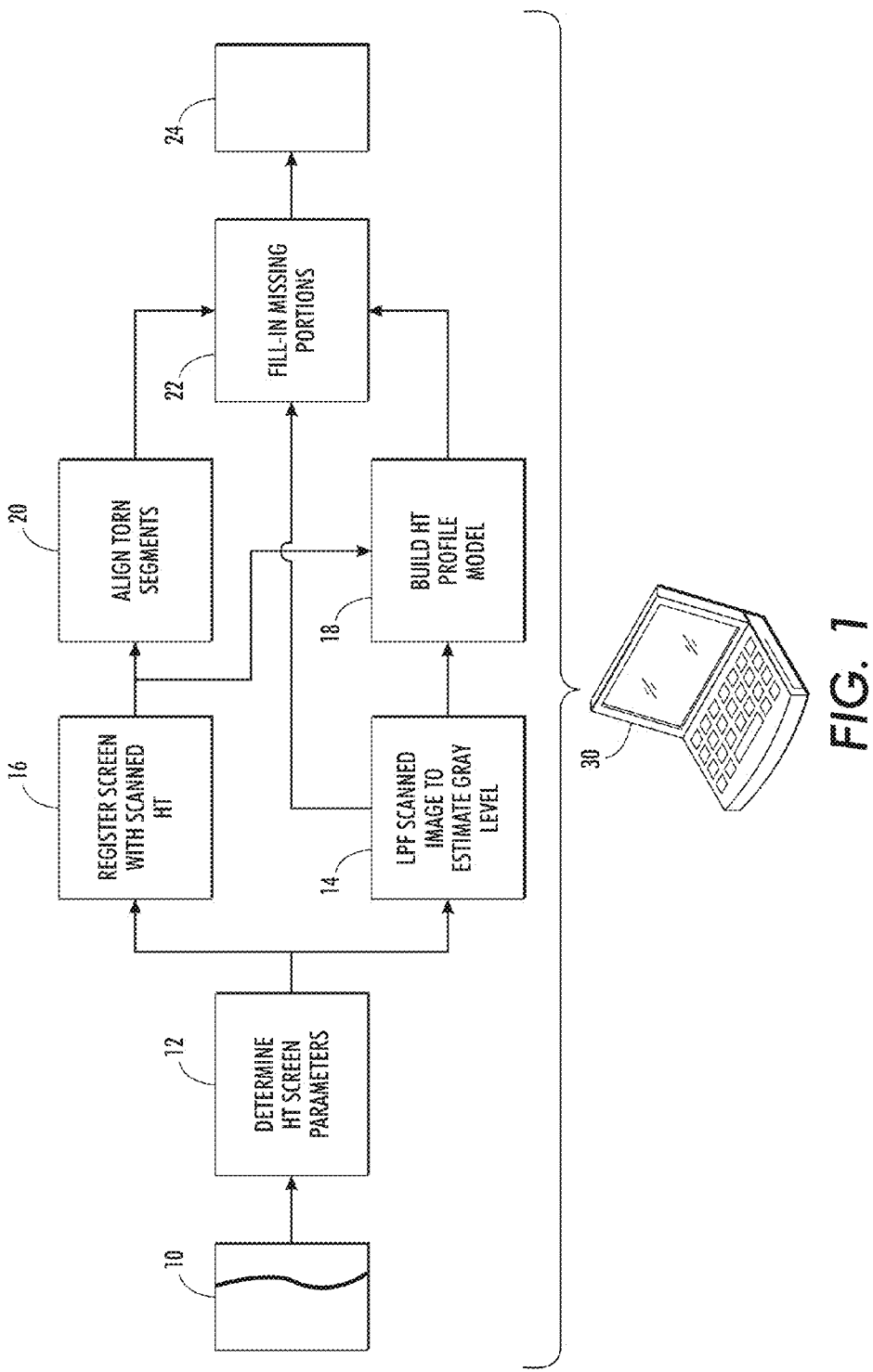

110

REPAIR OR EDITING OF DAMAGED (TORN) SCANNED HALFTONE PRINTS

TECHNICAL FIELD

The presently disclosed embodiments are directed toward repair of damaged scanned documents and/or images.

BACKGROUND

Conventional document scanning services offer an option to manually repair damaged documents. Heritage preservation efforts also seek to preserve and repair the world's cultural documents. Approaches to such repairs are either performed by hand on an original document or are performed digitally to correct problems such as contone image degradation or to perform document clean-up. Conventional approaches do not provide a digital repair method for halftoned images.

Document scanning and digitization is a large business, but conventional techniques do not provide a restoration service for halftoned documents. For example, when documents have staples, wrinkles, or tears, preparation for scanning is done manually by specialists. A team of specialists can remove staples, paper clips, binder clips, post-it notes, and manually perform triage or repair of torn documents for scanning. Depending on the extent of wrinkles or tears, the scanning specialist will choose to use an automated feeder or will place the documents directly on the glass for scanning.

Other document repair approaches can correct, retouch, repair, and restore old, torn, scratched, damaged, faded and/or washed out documents. Once corrected, retouched, repaired, and restored, such approaches can provide custom prints of the document (or documents) and archive the images on CD/ROM. However, these approaches are not practicable to damaged halftoned documents.

Other conventional approaches are designed to enable students, conservators, documentation specialists, museum curators, heritage managers and members of the general public to plug in anywhere and study and work together in the cultural heritage sector, which is striving to preserve the common heritage of mankind.

There is a need in the art for systems and methods that facilitate restoration and editing of scanned and/or digitized halftoned images and/or documents while overcoming the aforementioned deficiencies.

BRIEF DESCRIPTION

In one aspect, a computer-implemented method for repairing an electronic version of a damaged document comprises receiving a scanned halftone image of the damaged document, determining one or more halftone structure parameters, and estimating contone gray levels for portions of the damaged document. The method further comprises identifying locations of halftone cell tiles in the damaged document and the positions of pixels within the identified tiles, and building a halftone profile model that describes halftone dot growth patterns using the determined halftone parameters and estimated contone gray levels. Additionally, the method comprises filling in a damaged region of the document using the halftone profile model and the estimated contone gray levels to generate a restored digital halftone image, and outputting the restored digital halftone image.

In another aspect, a system that facilitates repairing an electronic version of a damaged document comprises a non-transitory computer-readable medium that stores computer-executable instructions for execution by a processor, and a processor configured to execute the instructions. The instructions comprise receiving a scanned halftone image of the damaged document, determining one or more halftone structure parameters, estimating contone gray levels for portions of the damaged document, and identifying locations of halftone cell tiles in the damaged document and the positions of pixels within the identified tiles. The instructions further comprise building a halftone profile model that describes halftone dot growth patterns using the determined halftone parameters and estimated contone gray levels, filling in a damaged region of the document using the halftone profile model and estimated contone gray levels to generate a restored digital halftone image, and outputting the restored digital halftone image.

In yet another aspect, a computer-implemented method for editing a halftone image comprises determining a geometry of a screen that was used to produce the halftone image, determining one or more halftone structure parameters of the halftone image, and estimating contone gray levels for portions of the halftone image. The method further comprises interpolating gray levels around or near the edited region, filling in a portion of the edited region using the interpolated gray level values, and employing the estimated contone gray levels to generate an edited digital halftone image. The edited digital halftone image is then output.

BRIEF DESCRIPTION OF THE DRAWINGS

FIG. 1 illustrates a method for restoring a damaged digital halftone input image, in accordance with one or more features described herein.

DETAILED DESCRIPTION

Figure 2A:
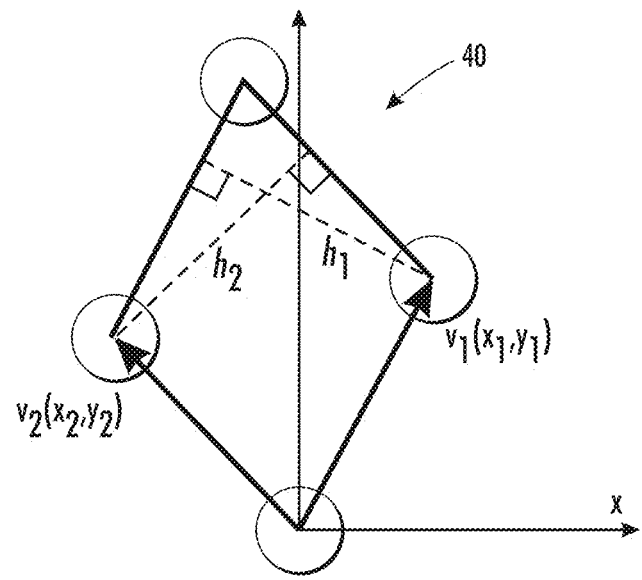
FIGS. 2A and 2B illustrate dual representations of a non-orthogonal halftone structure, in accordance with various features described herein.

The above-described problem is solved by aligning, restoring and/or editing portions of a document that comprises a digital halftone image. Fine alignment of portions of the image is facilitated by using the halftone structure and filling in missing portions using a halftone model adapted from the image. According to one example, a method includes estimating parameters of the halftone structure (geometry), estimating the intended contone gray level for portions of the image, finding the location of halftone cell tiles in the scanned image based on the halftone structure, building a halftone profile model (i.e., describing dot growth patterns and the like) using the estimated halftone parameters and contone information. The method further includes aligning segments using global features for coarse alignment and halftone structure features for fine alignment, such as in cases where the scanned halftone image contains unconnected fragments (e.g., different pieces of a torn document), and filling in missing parts of the image using the halftone profile model and estimated contone values.

FIG. 1 illustrates a method for restoring a damaged digital halftone input image 10, in accordance with one or more features described herein. The method facilitates fine alignment of portions of the input image 10 using the halftone structure, and filling in missing portions using a halftone model adapted from the given image. It will be appreciated that the various acts described with regard to the method(s) described herein need not be performed in a particular order described herein and/or need not be performed sequentially as will be appreciated by those of skill in the art.

At 12, the input image 10 is received and the parameters (e.g., orientation and frequency) of the halftone structure are estimated. In particular, the geometry (i.e., the position, orientation, etc., of cells or tiles within the image) of a screen that was used to produce the scanned halftone image is estimated or determined. In one example, frequency analysis is used to perform the estimation. At 14, the intended contone gray levels for the image are estimated. In one example, a filtering technique (e.g., a low pass filter or the like) is used that employs the halftone structure parameters in the filter design, as estimated at 12. At 16, the location(s) of halftone cell tiles in the scanned image is/are identified based on the halftone structure and the given scanned halftone image, and the positions of pixels within the tiles are determined. At 18, a halftone profile model that describes halftone dot growth patterns is built using the estimated halftone parameters generated at 12 and 16 and contone information generated at 14. If the scanned halftone image contains unconnected fragments or segments (e.g., different pieces of a torn document), then at 20 all unconnected fragments or segments are aligned using global features (e.g., page corners, edges, etc.) for coarse alignment and halftone structure for fine alignment. At 22, missing parts of the image are filled in (e.g., interpolated) using the halftone profile model generated at 18 and the estimated contone values generated at 14, and a restored digital halftone image 24 is output. In one example, the missing parts are filled in by analyzing the gray level around or near the damaged region (e.g., a tear, staple hole, punched hole, or other damaged portion of the document or page) and interpolating halftone appearance within the damaged region.

The proposed algorithm thus utilizes estimated halftone parameters (e.g., halftone cell size and frequency components) from the scanned version of the torn document to account for variations in halftone parameters of different halftone screens used to create different documents. Such variations may include, but are not limited to, for example, the specific characteristics of the printed halftone dots (which depend on the original halftone method), the printing process used, the age of the document, the conditions of the environment in which the document was stored, the scanning process, etc.

It will be appreciated that the method of FIG. 1 can be implemented by a computer 30, which comprises a processor (such as the processor 124 of FIG. 9) that executes, and a memory (such as the memory 126 of FIG. 9) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 9), a system memory (see, e.g., FIG. 9), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2B:
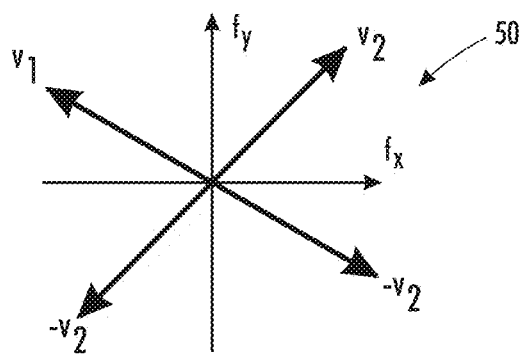

With continued reference to FIG. 1, FIGS. 2A and 2B illustrate dual representations of a non-orthogonal, periodic halftone structure, such as is estimated at 12 (FIG. 1) in accordance with various features described herein. In one example, when estimating the parameters of the halftone structure at 12, the geometry of the periodic screen that was used to produce the scanned halftone image. The periodic aspect of the cluster-based halftone geometric structure can be represented by two spatial frequency vectors. For a scanned halftone image, the two frequency vectors are estimated via an FFT-based frequency analysis. Fourier analysis is applied on the entire scanned image or on portions of it, such as those containing clearly distinguishable halftone structures. The frequency parameters of a halftone structure are uniquely defined by the two spatial frequency vectors $v_1(f_{x1}, f_{y1})$ and $v_2(f_{x2}, f_{y2})$, as illustrated in FIG. 2B. The scalar components of these vectors can be determined by finding the location of the two non-zero peaks of the modulus (magnitude) of the FFT of the image being analyzed.

Similarly, a non-orthogonal 2-D periodic halftone structure can be also specified by a halftone cell, that is, the parallelogram defined by four adjacent cluster centers. This parallelogram is in turn defined by the two vectors $v_1(x_1, y_1)$ and $v_2(x_2, y_2)$, as illustrated in FIG. 2A. The two fundamental frequencies of the Fourier transform, $V_1(f_{x1}, f_{y1})$ and $V_2(f_{x2}, f_{y2})$, have moduli $|V_1|$ and $|V_2|$ respectively. These vector lengths are equal to the reciprocals of $h_1$ and $h_2$, which are the heights (pitches) of the parallelogram from FIG. 2(a), depicted by the dotted lines. Since the product, $|v_1|*h_1=|v_2|*h_2=A$, is the area of the specified parallelogram, the moduli of the frequency vectors $V_1$ and $V_2$ can be defined as:

$$|V_1| = \frac{|v_1|}{A}, \tag{1a}$$

$$|V_2| = \frac{|v_2|}{A}, \tag{1b}$$

where A is given by the absolute value of the cross product of two vectors, $v_1 \times v_2$. In other words, $$A=|x_1 y_2 - x_2 y_1|. \tag{1c}$$

The halftone cell parameters that determine the cluster shape of the halftone structure are uniquely specified by the two spatial vectors $v_1(x_1, y_1)$ and $v_2(x_2, y_2)$. It can be shown that the scalar components of these vectors can be computed as follows:

$$x_1 = \frac{f_{y1}}{A}, \tag{2a}$$

$$y_1 = \frac{-f_{x1}}{A}, \tag{2b}$$

$$x_2 = \frac{f_{y2}}{A}, \tag{2c}$$

$$y_2 = \frac{-f_{x2}}{A}, \tag{2d}$$

where $$A = |f_{x1} f_{y2} - f_{x2} f_{y1}|. \tag{2e}$$

In one example, a Fast-Fourier-Transform (FFT) is calculated on a portion of a halftone image with 1024×1024 pixels. Two non-zero peaks are found at (171, 0) and (0, 128), respectively. In this case, the halftone structure can be represented by the two following frequency vectors, $V_1(f_{x1}, f_{y1})$ and $V_2(f_{x2}, f_{y2})$:

$f_{x1}=171*600/1024=100.2, f_{y1}=0;$ $f_{x2}=0, f_{y2}=128*600/1024=75.0.$

The units of the above frequency vector components are cycles-per-inch (cpi). As previously illustrated, the halftone structure can also be uniquely specified in terms of the spatial vectors $v_1(x_1, y_1)$ and $v_2(x_2, y_2)$ which can be derived via Eqs. (2a-2e) as:

$x_1=0, y_1=-1/75.0;$ $x_2=1/100.2, y_2=0;$ and $A=100.2*75.0=7515.0.$

The units of the above spatial vector components are inches, which can also be expressed in pixels at 600 dpi:

$x_1=0, y_1=-8.0;$ $x_2=5.99, y_2=0.$

The two spatial vectors $v_1(x_1, y_1)$ and $v_2(x_2, y_2)$ define the size and the shape of the halftone cell (or tile) that was used to generate the two-dimensional periodic halftone pattern. The two vectors that result from the frequency analysis may be floating number elements as opposed to integer values such as those obtained in the present example. In another embodiment, the resolution of the scanned halftone image is adjusted by digitally scaling (e.g., re-sampling) or scanning the document at a different resolution. The scaling factor and the scan resolution can be chosen so that the resulting spatial vector elements can be rounded off to integers with negligible error.

When estimating the intended contone gray level for portions of the image, such as at 14 (FIG. 1), the estimated contone gray level that the halftone structure is intended to represent for regions within the image is employed for subsequent processing steps. To accurately estimate the appearance of a damaged area of a halftone image, an estimate of the intended contone gray level values of the area is generated using gray levels that are located in the vicinity of the area. Additionally, to build a halftone profile function that accurately describes the way dots are grown as a function of gray level, a correspondence is established between dot shape and/or size and the estimated original contone values of the image before halftoning was performed.

The contone levels can be estimated using a form of "descreening" technique such as is known the art. In one embodiment, a low pass filter is employed for the descreening operation. Knowledge of the halftone screen parameters enables the design of a descreening low-pass kernel. One embodiment uses a uniform valued kernel that is the shape of the halftone cell. The image resulting from this filtering process contains continuous-tone gray values that correspond to estimates of the gray values of the original image before halftoning was applied.

Figure 3:
FIG. 3 shows a scanned version of a torn halftoned document, in accordance with more features described herein.
Figure 4:
FIG. 4 illustrates an image on which low-pass filtering has been performed, in accordance with one or more aspects described herein.
Figure 5A:
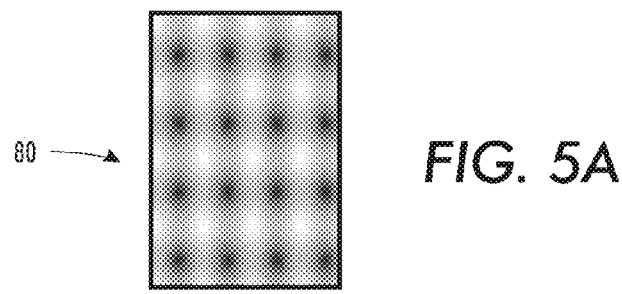
FIGS. 5A-5D show four cross correlation results from computation of cross-correlations between the halftone cells and the windowed halftone image, in accordance with one or more aspects described herein.
Figure 5B:
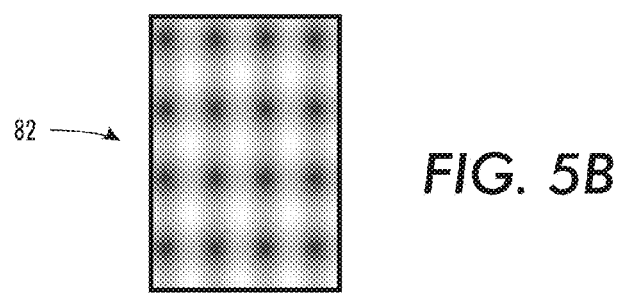
Figure 5C:
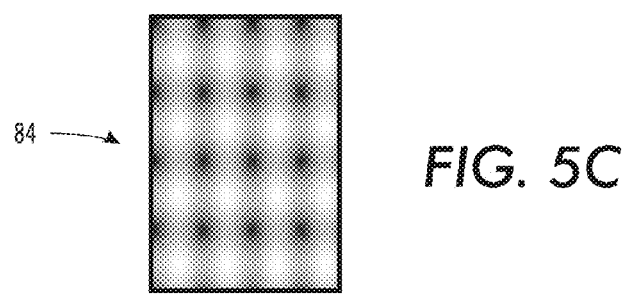
Figure 5D:
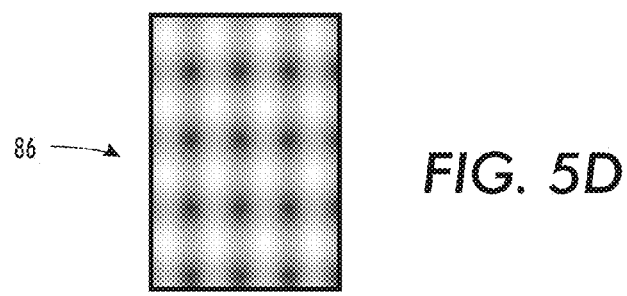

FIG. 4 illustrates an image 70 resulting from the low-pass filtering of the image 60 from FIG. 3 with a constant 6×8 pixel averaging rectangular kernel, which matches the shape and size of the halftone cell for the image of FIG. 3, as defined by $v_1$ and $v_2$.

As described at 16 (FIG. 1), the location of halftone cell tiles in the scanned image is determined based on the halftone structure and the given scanned halftone image, and the positions of pixels within the tiles are determined. The contone value g(x, y) of each pixel at position (x, y) of the scanned halftone image depends on the original input value $g_o(x, y)$ of the halftone process as well as the relative position of the pixel (δx, δy) inside the halftone cell. While the original input value $g_o(x, y)$ is typically unknown, it can be estimated by the filtering process conducted in the previous step (e.g., step 14 of FIG. 1). The relative position of a pixel (δx, δy) inside the halftone cell can be determined by performing a cross-correlation operation between a cropped halftone image g(x, y) and the halftone structure specified by:

$$h(x,y)=\cos\lfloor 2\pi(x \cdot f_{x1}+y \cdot f_{y1})\rfloor+\cos\lfloor 2\pi(x \cdot f_{x2}+y \cdot f_{y2})\rfloor, \tag{3}$$

where $f_{x1}$, $f_{y1}$ and $f_{x2}$, $f_{y2}$ are the spatial frequency vector components estimated at 14.

The cropping window is centered at location (x, y) and its shape and size are chosen such that it contains an integer number of halftone cells. The shape and size of the cropping window are determined by $mv_1(mx_1, my_1)$ and $nv_2(nx_2, ny_2)$, where m and n are two chosen integers and $v_1(x_1, y_1)$ and $v_2(x_2, y_2)$ are the two spatial vectors that define the size and the shape of the halftone cell. The location of the peak value of the cross-correlation between the cropped portion of the image and the halftone cell from Eq. (3) determines the relative position ($\delta x$, $\delta y$) inside the halftone cell for the pixel located at position (x, y).

A cross correlation is calculated by computing the inverse FFT (IFFT) of the product of the two FFTs of the cropped image and the halftone cell structure. Since the Fourier transform of the halftone structure function described by Eq. (3) results in two pairs of delta functions, the product of the two FFTs is also two pairs of delta functions modulated by two arguments defined by:

$$Arg_1 = Im\{G_w(f_{x1}, f_{y1})\}/Re\{G_w(f_{x1}, f_{y1})\} \text{ and}$$

$$Arg_2 = Im\{G_w(f_{x2}, f_{y2})\}/Re\{G_w(f_{x2}, f_{y2})\}$$

where $G_w(f_x, f_y)$ is the FFT of the windowed halftone image g(x, y). Consequently, the cross-correlation c(x, y) may be written as:

$$c(x,y) = \cos\lfloor 2\pi(x \cdot f_{x1} + y \cdot f_{y1}) + Arg_1 \rfloor + \cos\lfloor 2\pi(x \cdot f_{x2} + y \cdot f_{y2}) + Arg_2 \rfloor. \quad (4)$$

From Eq. (4), it is evident that c(x, y) is maximum at locations ($\delta x$, $\delta y$) satisfying the following conditions:

$$2\pi(\delta x \cdot f_{x1} + \delta y \cdot f_{y1}) + Arg_1 = 0. \quad (5a)$$

$$2\pi(\delta x \cdot f_{x2} + \delta y \cdot f_{y2}) + Arg_2 = 0. \quad (5b)$$

FIGS. 5A-5D show four cross correlation results 80, 82, 84, 86 from computation of cross-correlations between the halftone cells and the windowed halftone image with (a) $Arg_1 = Arg_2 = 0$; (b) $Arg_1 = Arg_2 = \pi/2$; (c) $Arg_1 = Arg_2 = \pi$, (d) $Arg_1 = Arg_2 = 3\pi/2$, respectively. At this point, a halftone profile model (spot function) is built using the estimated halftone parameters and contone information, such as is described with regard to 18 (FIG. 1). A halftone profile model predicts the scanned contone value g based on the estimated original input value of the halftoning process $g_o$ and the pixel location ($\delta x$, $\delta y$) relative to the halftone structure tiling. Symbolically, a halftone profile model is expressed in functional form as g ($g_o$, $\delta x$, $\delta y$). In general, g ($g_o$, $\delta x$, $\delta y$) is a smooth, non-linear function and it depends on the original halftone screen parameters, the printing process used, the age of the document, the conditions of the environment in which the document was stored, the scanning process and other factors. A suitable profile model is built (e.g., at 18, FIG. 1), according to one example, by learning from the target document itself. Estimation of $\delta x$, $\delta y$ and $g_o$ from the scanned halftone image is performed as previously described. Many data fitting methods can be used in order to build the profile model. Examples of fitting methods include multi-layer artificial neural networks and multiple variable regression methods.

When aligning image segments as described at 20 (FIG. 1), if the scanned halftone image contains unconnected fragments (e.g., different pieces of a torn document), all segments are aligned using global features for coarse alignment and halftone structure for fine alignment. Coarse alignment can be performed by exploiting knowledge of certain global features of the document. For example, alignment based on length and orientation of the edges of the page that were unaffected by the tear can be performed. Global cues to alignment provided by image content itself can also be used; specifically, boundaries of the printed area or salient features of the printed image/document on each side of the tear can also be used for alignment. Alignment of the halftone structure is performed to mitigate visible artifacts. This feature of the described systems and methods is in contrast to conventional image restoration techniques, which do not consider this problem. The halftone structure parameters and estimated spatial information provide guidance for accurate alignment of the multiple segments. More specifically, from the halftone structure parameters estimated at 12, relative angle of orientation or skew between the document segments can be estimated. Digital rotation can be applied to correct any existing differences in orientation. From the individual pixel locations ($\delta x$, $\delta y$) estimated at 16, phase differences between pixels from multiple document segments can be accurately calculated. Alignment between the different portions of the document is achieved by optimizing phase transitions between document segments across different alignment candidates.

Figure 6:
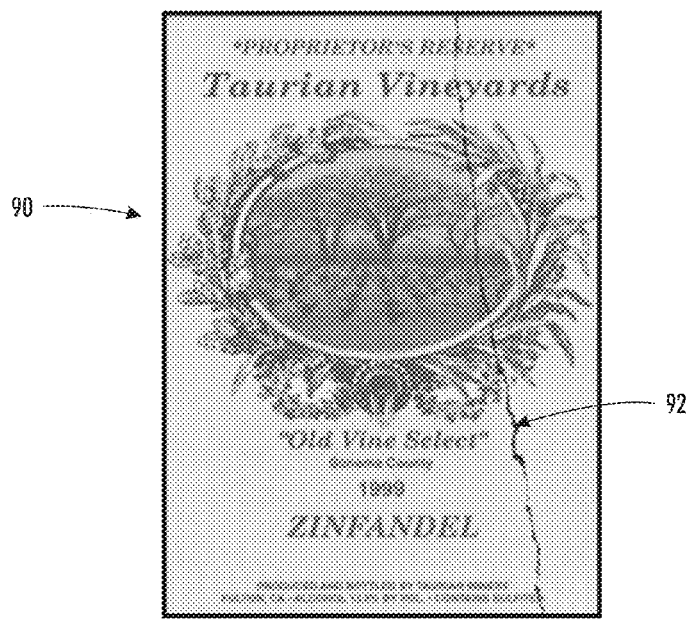
FIG. 6 illustrates a halftone image resulting from alignment of two torn portions, in accordance with one or more features described herein.

FIG. 6 illustrates a halftone image 90 resulting from alignment of the two torn portions illustrated in FIG. 3, as performed at 16 (FIG. 1). That is, two torn fragments of the document from FIG. 3 are aligned based on the estimated halftone structure parameters and spatial information from generated at 12 and 16 (FIG. 1). Black pixels 92 located along the gap between the two document portions represent pixels whose values are missing.

As described at 22 (FIG. 1), missing parts of the image are filled in using the halftone profile model and the estimated contone values. Torn and aging documents often have portions with unknown intensities. A missing part of a damaged halftone image, such as the black gap 92 shown in FIG. 6, can be recovered using the halftone profile model obtained at 18 (FIG. 1). Some known methods "guess" or estimate the missing contone values given the estimated contone values in the regions. In this particular example, where the gap runs more or less vertically, the original input contone values $g_o$ of the pixels along the gap are estimated via a one-dimensional linear interpolation process between the known contone values of the pixels located on either side of the gap, as estimated via the filtering at 14 (FIG. 1). The location ($\delta x$, $\delta y$) of every pixel in the gap relative to the halftone cell is estimated at 16 (FIG. 1) with a moving window of size equal to, e.g., 4×4 halftone cells. The contone values predicted by the halftone profile model obtained at 20 (FIG. 1) with inputs $g_o$, $\delta x$ and $\delta y$ are used to fill in the gap (e.g., at 22, FIG. 1).

Figure 7:
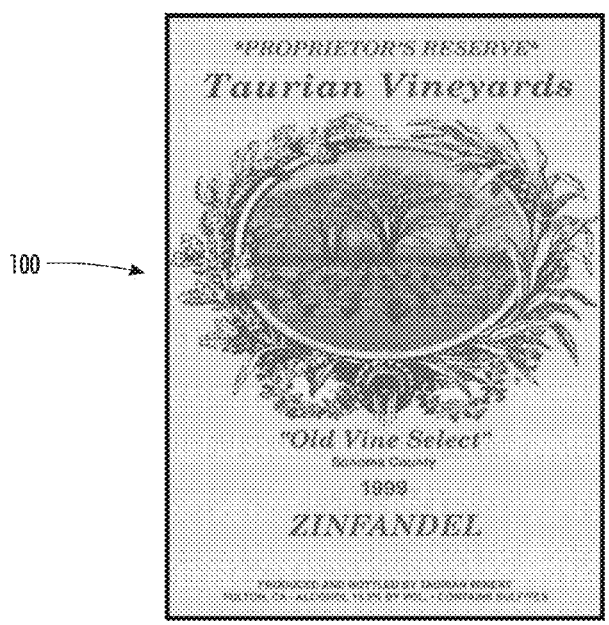
FIG. 7 shows a recovered document, in accordance with one or more features described herein.

FIG. 7 shows the recovered document 100, in accordance with one or more features described herein. The gap 92 (FIG. 6) has been filled in with matched halftone patterns, and is no longer visible in the recovered document.

Figure 8:
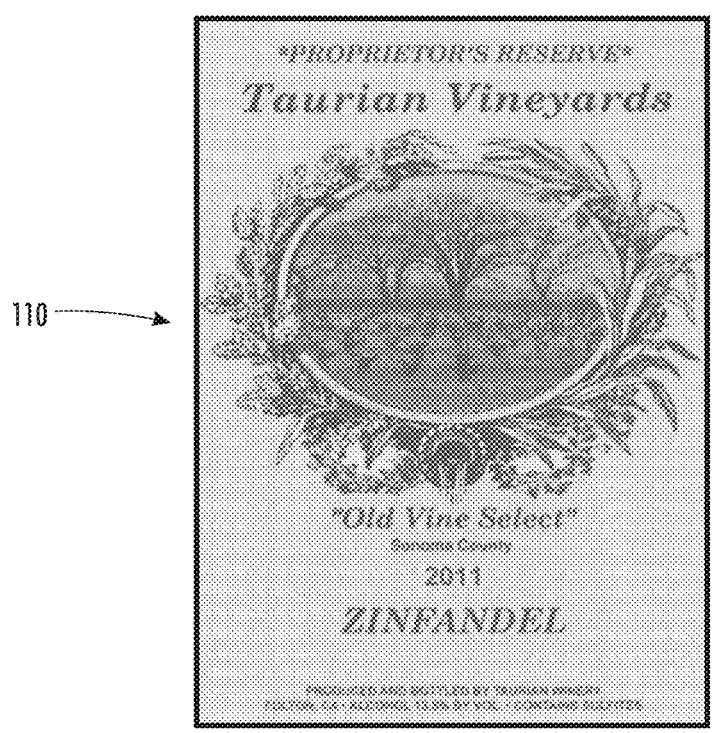
FIG. 8 illustrates an alternative application of the described method, in which seamless replacement of portions of a scanned document is performed, in accordance with one or more features described herein.

FIG. 8 illustrates an alternative application of the described method, in which seamless replacement of portions of a halftone image is performed, in accordance with one or more features described herein. In the image 110, the wine label of FIG. 7 has a modified harvest year (i.e., 1999 has been replaced with 2011). The halftone image is received in digital form or may be scanned to obtain a digital form of the image. Rather than operate in the vicinity of a damaged region, in the editing application, the embodiment operates on a region to be edited. Editing can involve deleting, inserting, overwriting, or replacing portions of the image. In many cases the editing can requiring filling in of halftone structure that was not originally present in the obtained halftone image. For example, editing the letter "R" to be "P" would require filling in the deleted descending stroke area for halftone structure. Typical applications may include, for instance, variable data printing techniques that are employed to edit text in the halftone image. In another example, "in-painting" techniques can be employed to remove timestamps, dates, etc., from restored image documents, such as photographs or the like. For instance, an edited version of an image object, such as a digit, letter, or an image object that has been edited to change its size or form factor, may have space around it that does not look natural (e.g., space previously occupied by the unedited image object). For example, a date on a photograph may be edited to change an 8 to a 3, in which case the open ends of the 3 may exhibit unfilled spaces resulting from the removal of the 8. Similarly, a deleted character or object may leave a noticeable blank space in the image. In such cases, the filling techniques described herein can be employed to fill in any unfilled space resulting from the edit or deletion.

Figure 9:
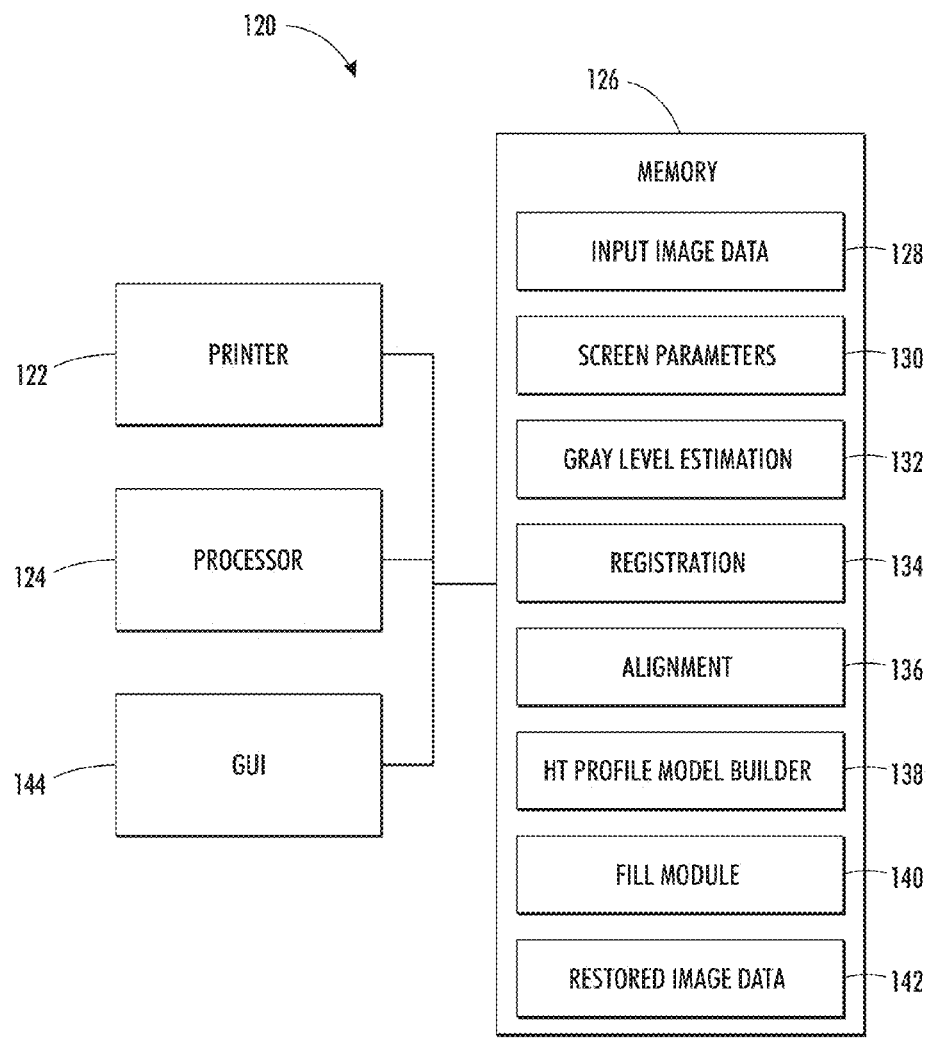
FIG. 9 illustrates a system that facilitates restoring a damaged digital halftone input image, in accordance with one or more aspects described herein.

FIG. 9 illustrates a system 120 that facilitates restoring a damaged digital halftone input image, in accordance with one or more aspects described herein. The system is configured to perform the method(s), techniques, etc., described herein with regard to the preceding figures, and comprises a print engine 122 that is coupled to a processor 124 that executes, and a memory 126 that stores computer-executable instructions for performing the various functions, methods, techniques, steps, and the like described herein. The processor 124 and memory 126 may be integral to each other or remote but operably coupled to each other. In another embodiment, the processor 124 and memory 126 are integral to the printer 122. In another embodiment, the processor and memory reside in a computer (e.g., the computer 30 of FIG. 1) that is operably coupled to the printer 122.

As stated above, the system 120 comprises the processor 124 that executes, and the memory 126 that stores one or more computer-executable modules (e.g., programs, computer-executable instructions, etc.) for performing the various functions, methods, procedures, etc., described herein. "Module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

An input image is received by the processor 124 and input image data 128 is stored in the memory 126. The processor executes a screen parameters module 130 that estimates the parameters of the halftone structure. In particular, the geometry of a screen that was used to produce the scanned halftone image is estimated or determined. In one example, frequency analysis is used to perform the estimation. The processor also executes a gray level estimation module 132 that estimates the intended contone gray levels for portions of the image. In one example, a filtering technique (e.g., a low pass filter or the like) is used that employs the halftone structure parameters in the filter design. A registration module 134 is executed by the processor to identify the location(s) of halftone cell tiles in the scanned image based on the halftone structure and the given scanned halftone image, and to determine the positions of pixels within the tiles are determined. A halftone profile model builder module 136 is executed by the processor that builds a halftone profile model using the estimated halftone parameters 6 and contone information. If the scanned halftone image contains unconnected fragments or segments (e.g., different pieces of a torn document), the processor executes an alignment module 138 that aligns all unconnected fragments or segments are aligned using global features for coarse alignment and halftone structure for fine alignment. The processor executes a fill module 140 that fills in missing parts of the image using the halftone profile model and the estimated contone values to generate a restored digital halftone image 142 which can be output to the printer 102 for printing. In another embodiment, the output halftone image is displayed graphically on a graphical user interface 144 that may be integral to the printer 122, remote but operably coupled thereto, or may reside on a computer such as the computer 30 of FIG. 1.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for repairing an electronic version of a damaged document, comprising:
receiving a scanned halftone image of the damaged document;
determining that the scanned halftone image comprises unconnected fragments;
aligning the unconnected fragments using global features for coarse alignment and halftone structure for fine alignment;
determining one or more halftone structure parameters;
estimating contone gray levels for portions of the damaged document;
identifying locations of halftone cell tiles in the damaged document and positions of pixels within the identified tiles;
building a halftone profile model that describes halftone dot growth patterns using the determined halftone parameters and the estimated contone gray levels;
filling in a damaged region of the document using the halftone profile model and the estimated contone gray levels to generate a restored digital halftone image; and
outputting the restored digital halftone image.

2. The method according to claim 1, wherein the unconnected fragments are unconnected due to at least one of a tear in the damaged document and a hole in the damaged document.

3. The method according to claim 1, wherein the global features comprise one or more of document edges, image attributes and document corners.

4. The method according to claim 1, wherein the halftone structure parameters comprise one or more of dot orientation information and dot frequency information for a plurality of dots in the halftone structure.

5. The method according to claim 1, wherein the determining the one or more halftone structure parameters further comprises determining a geometry of a screen that was used to produce the scanned halftone image.

6. The method according to claim 5, further comprising performing frequency analysis to determine the geometry of the screen.

7. The method according to claim 1, wherein the estimating the contone gray levels is performed using a low pass filter.

8. The method according to claim 1, wherein filling in the damaged region further comprises interpolating gray levels around or near the damaged region and filling in the damaged region using the interpolated gray level values.

9. A processor configured to execute computer-executable instructions for performing the method of claim 1, the instructions being stored on a non-transitory computer-readable medium.

10. A system that facilitates repairing an electronic version of a damaged document, comprising:
- a non-transitory computer-readable medium that stores computer-executable instructions for execution by a processor; and
- wherein the processor is configured to execute the instructions, the instructions comprising:
  - receiving a scanned halftone image of the damaged document;
  - determining that the scanned halftone image comprises unconnected fragments;
  - aligning the unconnected fragments using global features for coarse alignment and halftone structure for fine alignment;
  - determining one or more halftone structure parameters;
  - estimating contone gray levels for portions of the damaged document;
  - identifying locations of halftone cell tiles in the damaged document and positions of pixels within the identified tiles;
  - building a halftone profile model that describes halftone dot growth patterns using the determined halftone parameters and the estimated contone gray levels;
  - filling in a damaged region of the document using the halftone profile model and the estimated contone gray levels to generate a restored digital halftone image; and
  - outputting the restored digital halftone image.

11. The system according to claim 10, wherein the unconnected fragments are unconnected due to at least one of a tear in the damaged document and a hole in the damaged document.

12. The system according to claim 10, wherein the global features comprises one or more of document edges and document corners.

13. The method according to claim 10, wherein the halftone structure parameters comprise one or more of dot orientation information and dot frequency information for a plurality of dots in the halftone structure.

14. The system according to claim 10, wherein the instructions for determining the one or more halftone structure parameters further comprises instructions for determining a geometry of a screen that was used to produce the scanned halftone image.

15. The system according to claim 14, further comprising instructions for performing frequency analysis to determine the geometry of the screen.

16. The system according to claim 10, wherein a low pass filter is employed to estimate the contone gray levels.

17. The system according to claim 10, wherein the instructions for filling in the damaged region further comprise instructions for interpolating gray levels around or near the damaged region and filling in the damaged region using the interpolated gray values.

* * * * *